INVENTOR.
Ezio D. Cotta

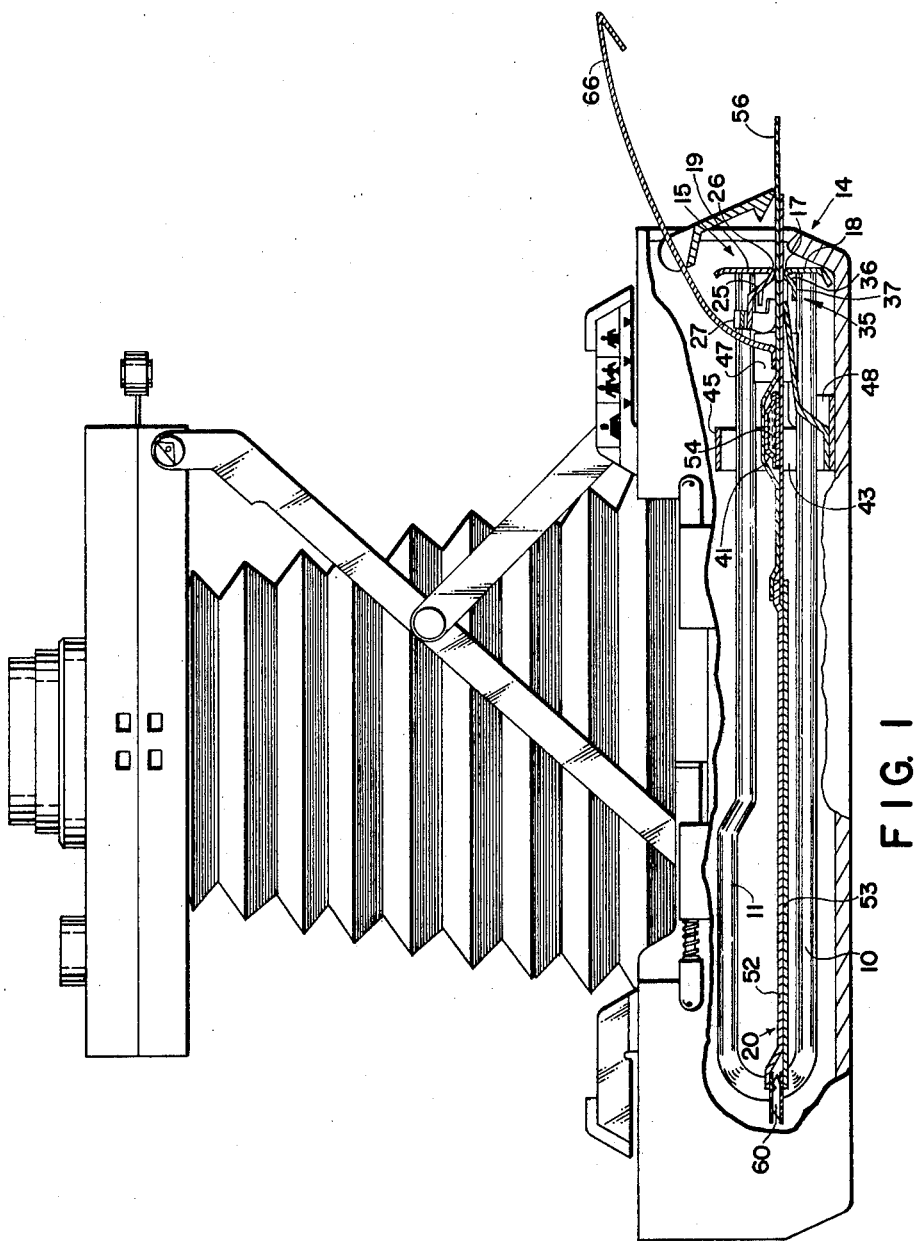

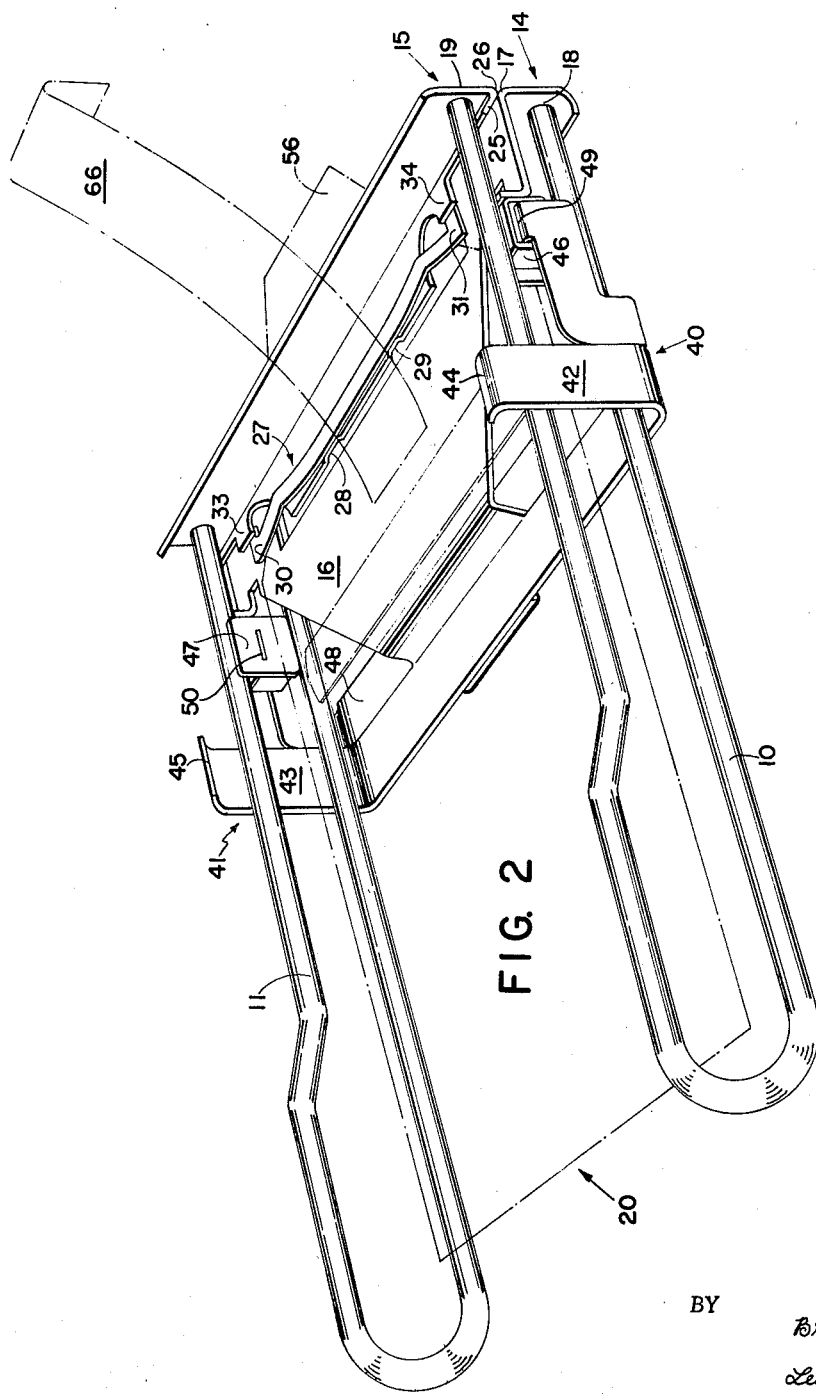

BY Brown and Mikulka
and
Leonard S. Selman
ATTORNEYS

United States Patent Office 3,499,373
Patented Mar. 10, 1970

3,499,373
PHOTOGRAPHIC APPARATUS
Ezio D. Cotta, Dorchester, Mass., assignor to Polaroid Corporation, Cambridge, Mass., a corporation of Delaware
Filed July 25, 1967, Ser. No. 655,832
Int. Cl. G03b 17/50; G03d 3/00
U.S. Cl. 95—13                                21 Claims

ABSTRACT OF THE DISCLOSURE

A photographic processing apparatus in which a pair of cantilever springs are attached to opposite ends of a pair of rigid spreader members. The spreader members being utilized for distributing a processing liquid between a pair of superposed photographic sheets. In performing this function a leaf spring device is provided for preventing leakage of the processing liquid from between the sheets as well as regulating the relative spacing between the spreader members.

CROSS REFERENCE TO RELATED APPLICATIONS

The invention disclosed herein is related to the subject matter disclosed in copending applications; Ser. No. 655,-831 (Case No. 3540), filed July 25, 1967; Ser. No. 655,-833 (Case No. 3551), filed July 25, 1967; Ser. No. 655,-834 (Case No. 3552), filed July 25, 1967; and Ser. No. 655,835 (Case No. 3553), filed July 25, 1967, assigned to the same assignee.

SUMMARY OF THE INVENTION

The present invention is directed to a device which may be incorporated in a self-developing camera wherein a photographic transfer image is produced by moving a pair of film sheets including an exposed negative photosensitive sheet and a superposed positive receiving sheet, between a pair of juxtaposed pressure-applying members for distributing a processing liquid or developer between and in contact with the sheets. The preferred embodiment of the invention as disclosed herein provides a narrow gap between a pair of spring mounted sheet metal members through which the sheets are moved while the liquid introduced between the sheets is spread uniformly between and in contact with the entire facing surfaces of the sheets in a direction opposite the movement of the sheets relative to the pressure applying sheet metal members.

The spreader system which incorporates the present invention has many advanced features including its integral precise construction resulting in important savings in and its removability from the photographic cameras designed for its use therewith. The preferred embodiment of the spreading apparatus more particularly includes a pair of sheet metal spreaders bent precisely to form a pair of small radius edge means having a precisely defined gap therebetween through which the sheets are pulled thereby rupturing a processing liquid-containing pod carried by the sheets and spreading the liquid between the sheets. The sheet metal spreader members are permanently joined to a pair of springs which serve the dual function of supporting the spreader members in exactly aligned juxtaposed relation to one another and further to urge said spreader members toward each other with just enough force to provide a uniform spread of processing liquid between the photographic sheets with as small a pull force as is feasible.

In order to insure adequate coverage of the entire surface of the photographic sheets it is important to supply a liberal amount of the processing liquid to be spread between the sheet during formation of the photographic image. Some of this liquid has a tendency to leak at the side edges of the sheets during spreading and to prevent this leakage this invention provides edge control means which comprise a pair of spring-biased fingerlike members which engage the sheets and squeeze the side edges of the sheets of photographic material together blocking the liquid flow. Since these members are in contact with the sheets at all times as they are drawn toward the gap, it is also part of the invention to provide a dual function for these edge control members, specifically the sensing of the width of the sheets as they are advanced between the spreader members. An increase in width of the sheets may be due, for example, to a pair of spacer elements between the ends of the photographic sheets which serve to space the spreader members apart enough as they pass between said members to provide an adequate layer of processing liquid as it is spread between the sheets. As the edge control and sensing members contact these greater widths, they will be biased in a direction perpendicular to the sheet sufraces. To make it easier for these plastic elements or traps as they are called to get through the narrow gap between the spreader members the present invention provides means on the spreader members which are engaged by the edge control members when they have been biased more than a predetermined amount by the increasing thickness of the sheets to force the spreader members apart thereby widening the gap to accommodate the increased thicknesses.

Accordingly, it is an object of this invention to provide an improved spreading device for spreading liquid between a pair of sheets including a pair of spreader members having straight parallel adjacent portions juxtaposed to form a pressure-generating gap, spring means for urging the spreader members toward each other and means for automatically regulating the width of the gap.

It is another object of this invention to provide an improved spreading device for spreading liquid between a pair of sheets including a pair of spreader members having straight parallel adjacent portions juxtaposed to form a pressure-generating gap, spring means for urging the spreader member toward each other and edge control means which squeeze the side edges of the sheets to prevent leakage of liquid therefrom.

It is a further object of this invention to provide an improved device for spreading a layer of processing liquid between a pair of photographic sheets including a pair of spreader members having straight parallel portions juxtaposed to form a pressure-generating gap, spring means for urging the spreader members toward each other and edge control means which squeeze the side edges of the sheets to prevent leakage of processing liquid spread between the sheets during movement through said gap while sensing the thickness of the sheets to regulate the size of the gap.

Other objects of the invention will in part be obvious and will in part appear hereinafter.

The invention accordingly comprises the apparatus possessing the construction, combination of elements and arrangement of parts which are exemplified in the following detailed disclosure of a preferred embodiment taken in connection with the accompanying drawing wherein:

BRIEF DESCRIPTION OF THE DRAWINGS

FIGURE 1 is a side elevational view of a camera having mounted within and shown in cross section the preferred embodiment of the invention including the spring mounted spreader members and the edge control means;

FIG. 2 is a perspective view of the apparatus embodying the invention removed from the camera and including the sheet metal spring mounted spreader members and FIG. 3 is a front view of the apparatus showing the gap between the spreader members;

DESCRIPTION OF THE PREFERRED EMBODIMENT

Figure 4:
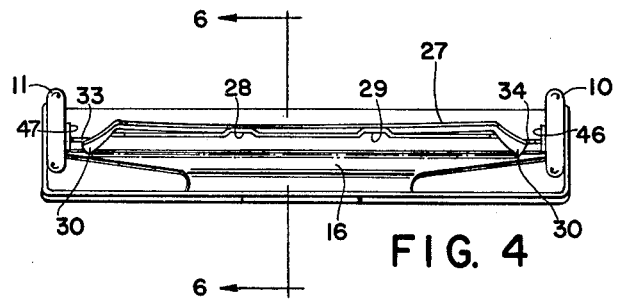
FIG. 4 is a rear view of the apparatus showing the edge control means mounted on one of the spreader members.

The spreading of a fluid composition in a uniformly thin layer between a pair of superposed sheets may be employed for effecting a number of various photographic processes and is particularly adapted, for example, to the processing of an exposed photosensitive stratum on one of the sheets to develop a latent image in the photosensitive stratum and/or produce a positive image in the other sheet by diffusion and transfer or reagents from the photosensitive stratum through or into the fluid layer. The present invention is concerned with the provisions of a spreading device adapted to be employed, for example, with a film unit comprising a first sheet having a photosensitive surface stratum and a second sheet superposed with the first sheet and having a surface stratum disposed adjacent the photosensitive stratum and adapted to receive a positive photographic image. The processing fluid may be supplied in a pod interposed between the sheets of the film unit and adapted to be moved through the gap between the pressure members so as to rupture the pod and distribute its contents between the sheets. To prevent the processing liquid from leaking out of the side edges of the sheet and to sense the thickness of the sheets and regulate the gap width, the edge control means of the present invention are mounted in one of the spreader members. The edge control means which, as conceived, accomplishes all of the above, comprises a single piece of spring metal which has a pair of end portions positioned to contact the side edges of the sheets of photographic material as they are moved through the gap. As described in detail in the following description, increases in the thicknesses of the sheet causes a displacement of these end portions and means are provided to regulate the gap width if the displacement exceeds a certain amount. In this way various films with different thicknesses may be used in a camera embodying the present invention and the gap width will be self-regulating. The following description describes both the structure of the preferred embodiment of the spring supported pressure members and the edge control and sheet sensing means.

FIGURES 1 and 2 of the drawing show the liquid distributing means of the present invention including a pair of U-shaped springs 10 and 11 which serve both to support a pair of precisely formed sheet metal spreader members 14 and 15 and to urge said members toward each other. The springs are spot welded to the spreader members adjacent the outside ends thereof with great care taken to locate said welds since the forces acting on said spreader members must be applied with great accuracy to achieve a uniform spread.

One of the important features of the present invention is the shape of the spreader members 14 and 15 as they converge toward one another as shown in FIGURE 1, to form a throat through which the layers of photographic sheet material are manually drawn. The spreader members are each formed of sheet metal which has the inherent capability of being easily bent to a desired shape. Thus, a single piece of sheet metal may be cut out and bent to form a platform 16, the small radius sheet contacting edge 17, and the support connecting portion 18. The platform 16 serves to guide the sheets of photographic material 20 into the gap between the spreader members. The edge 17 is formed as precisely as economically feasible to conform to the similar edge on spreader 15 to provide a uniform spread of the developer between the sheets. The support connecting portion 18 of the spreader member is bent and shaped to provide a suitable surface for welding the end of a pair of generally U-shaped cantilever type springs 10 and 11 to each end of the spreader member.

The other spreader member 15 also has a support connecting portion 19 to which is welded the other ends of the springs 10 and 11. This member has a back portion 25 which also helps to guide the sheets of film into the gap between the spreader members. The angle at which this back portion is bent is carefully controlled to provide a second small radius sheet contacting edge 26 which conforms to edge 17 on the spreader member 14.

Figure 5:
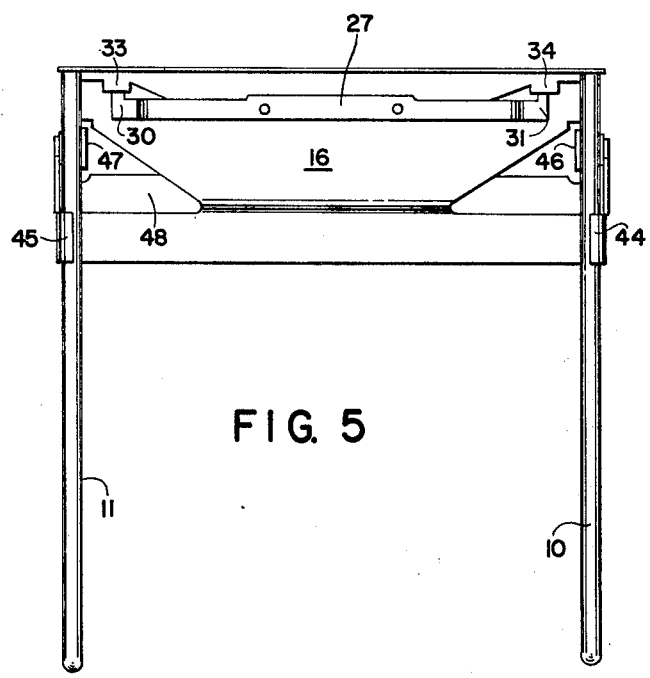
FIG. 5 is a top plan view of the apparatus.

FIGS. 2–4, inclusive, show in detail the dual function edge control-sheet sensing means 27. The elongated sheet metal leaf spring member is mounted on slightly raised portions 28 and 29 of spreader member 15. The end portions of said leaf spring members are bent to form sheet contacting portions 30 and 31 which as shown are positioned to squeeze the lateral edges of the photographic sheets against the platform 16 to prevent leakage of the processing liquid. In this position, the edge portions 30 and 31 are also in sheet sensing position to be biased by thicker portions of the film sheets as they are drawn toward the gap. As shown in FIG. 5, extensions 33 and 34 are provided on spreader member 15 directly above sheet contacting portions 30 and 31. Thicker portions of the film sheets may forcibly bias said portions against the extensions to urge spreader member 15 in a direction away from spreader 14 and widen the gap between the two spreader members.

As can be seen in FIGURE 1, the opposed surfaces of the spreader members 14 and 15 converge toward the gap and might present a possible obstacle to the introduction into said gap of increased thicknesses of sheet material, however, the dual function edge control-sheet sensing means 27 in conjunction with the platform surface presents more gently tapered opposed surfaces contours to facilitate the introduction therebetween of increased thicknesses of sheet material. It is also of interest to note that the force exerted by the leaf spring member against the sheet material or the platform surface opposes the force exerted by springs 10 and 11 urging the spreader members 14 and 15 toward one another. Thus, the edge control-sheet sensing leaf spring means 27 cannot increase the force required to pull the sheets between the spreader members as is the case with many of the prior art edge-control means.

Figure 6:
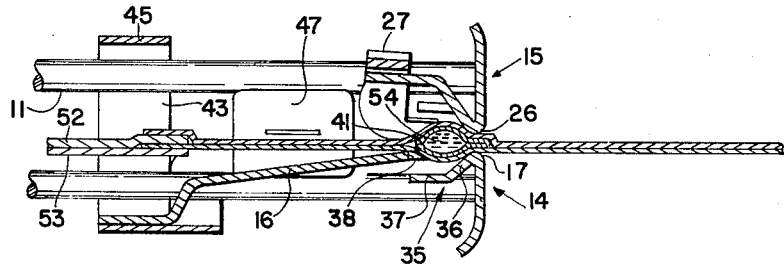
FIGS. 6–10, inclusive, are sequential cross-sectional views taken along lines 6—6 of FIG. 4 and show the travel of the film sheets through the spreaders.

FIGS. 6–10 show in detail the platform 16, as described in copending application Se. No. 655,835 (Case No. 3553), formed integrally with sheet metal spreader 14 having a relief formed therein near the sheet contacting edge. The platform may be further fastened to the spring arms by welding or other equivalent means. The relief is formed by making a generally U-shaped cut in the sheet metal and bending the tongue portion 35 formed thereby below the platform surface. The tongue 35 itself is bent near its midpoint as shown in FIGS. 6–10 to form portions 36 and 37 beneath the relief opening. As the photographic sheets are drawn toward the gap between spreader members 14 and 15, the pod which is distended just before rupture as shown in FIG. 6 is allowed to enter the relief preventing the hydraulic pressure built up in the pod liquid from widening the gap by forcing the spreader members apart. The upper portion 36 of the tongue portion is bent at an approximately 45-degree angle relative to the platform surface allowing the pod to be drawn smoothly through the gap while spreading the processing liquid therefrom uniformly over the width of the sheets. The raised edge portion 38 of the platform just before the relief also serves as a means to promote uniform spreading of the processing liquid by retarding the initial outward thrust of fluid as it is released upon rupture of pod 41. Instead of an excessive amount of fluid spurting between the sheets in the central area, a meniscus of fluid is formed which extends across the entire width of the sheets. This portion 38 also tends to minimize the effect of turbulence in the liquid which might prevent uniform liquid coverage.

As shown in FIG. 2, the restraining means 40 and 41, as described in copending application Ser. No. 655,833 (Case No. 3551), filed July 25, 1967, are formed integrally with platform 16 and have body portions 42 and 43 and bent over flange portions 44 and 45 which prevent the springs 10 and 11 from being overstressed by limiting the distance which the spring arms may be separated. The body portions 42 and 43 on the outside of springs 10 and 11 prevent lateral forces on the rigid members 14 and 15 from affecting the vertical alignment of the spring arms.

The cam type separating means, as shown in FIG. 2, and described in copending application Ser. No. 655,834 (Case No. 3552), filed July 25, 1967, for widening the gap between spreader members 14 and 15 for cleaning purposes consist of a pair of molded polypropylene camming elements 46 and 47 which engage the arms of springs 10 and 11. Elements 46 and 47 are positioned near the ends of the spring arms so that only a relatively small amount of force is required to forcibly separate the spreader members 14 and 15. The force is applied by means of element 48 which has a pair of end portions 49 and 50 embedded into camming elements 46 and 47. The portion of element 48 which extends between the springs 10 and 11 is manually grasped and forcibly rotated in a counter-clockwise direction to force the spreader members from their closed positions to their open position. The camming elements 46 and 47, when rotated, pass overcenter so that they will keep the spreader members in their open position until manually returned to the closed position by rotating element 48 clockwise.

Figure 7:
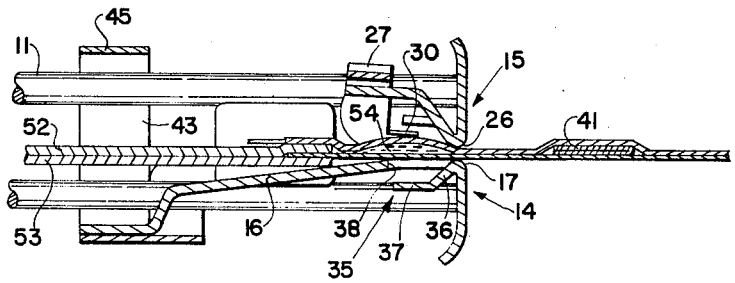
Figure 8:
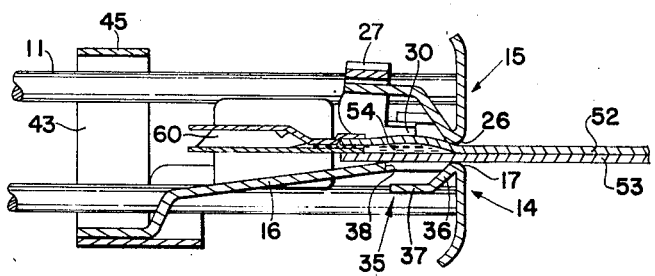
Figure 9:
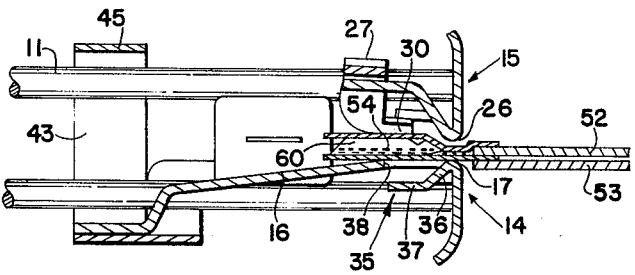
Figure 10:
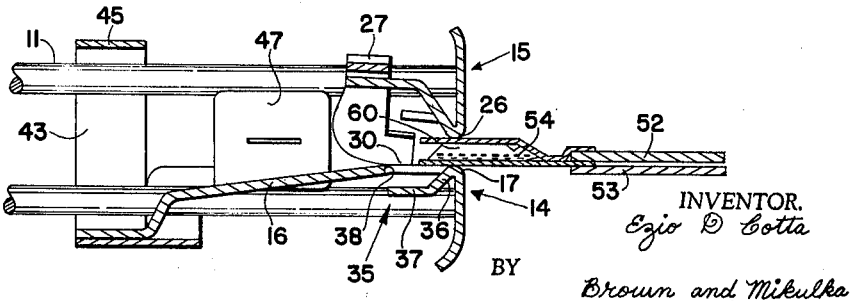

FIGS. 6–10 show sequentially in cross-section the travel of the film sheet including the leader 56, the pod 41 and the positive and negative film sheets 52 and 53 through the spreader members. FIG. 6 shows the pod 41 about to be ruptured as it is pulled through the narrow gap between spreader members 14 and 15. In FIG. 7, the processing fluid 54 trapped between the sheets forming the leader 56 is about to enter between the positive and negative sheets and the edge control and sheet sensing means 27 is about to engage the side edges of the positive sheet to prevent the leakage of processing fluid from the edges of the sheet. FIGURE 8 shows the edge control and sheet sensing means about to be engaged by a small piece of plastic 60 referred to as trap since its function is to cam open the spreader members 14 an 15 as the composite film sheet passes through so that the remaining processing fluid is not squeezed out of the end of the film sheets by pressure of the spreader members but is instead left or trapped at the end of the composite film sheets between the trap and its duplicate located on the other side of the film sheet in a paper extension at the end of the sheets. As shown in FIG. 9, the trap 60 engages the sheet contacting portion 30 and biases it against extension 33 to urge spreader member 15 in a direction away from spreader member 14 to widen the gap slightly between the two spreader members in anticipation of the trap itself passing through the gap. In FIG. 10, the trap 60 is shown passing through the gap and the widening of the gap as shown will prevent the processing liquid 54 from being squeezed from the end of the composite film sheet.

A pair of shoulders or bumps 63 and 64, as shown in FIG. 3, are formed in one of the spreader members near the ends of the sheet contacting edge portion to pregap the edges apart so that the film leader 56, as shown in FIGURES 1 and 2, may be manually pulled through the gap between the edges by means of the tab 66 typically heat sealed to the film leader. It should be understood that the film sheets as shown in FIGURE 1 are in processing position ready to be removed from the camera. U.S. Patent No. 2,991,702 shows a plurality of the film sheets stacked in a film pack as they are used in many of the present day self-developing cameras. In picture taking position, the negative sheet 53 with its photosensitive surface faces the open front of the film pack and the taking lens and then is pulled around and behind the positive sheet 52 by tab 66 as shown in FIGURE 1 in superposed position ready for processing. As the tab 66 pulls the leader 56 through the gap, the back portion 25 of spreader member 15 will support the leader at a position just before the gap and if the heat seals between tab 66 and the leader 65 are hard to break this support will prevent the leader from being pulled back through the gap into the camera. The leader 65 is then manually grasped and the photographic material comprising the negative sheet 53 and the positive sheet 52 and the pod 41 is pulled through the gap whereby the pod is broken and the processing liquid 54 is uniformly spread between the positive and negative sheets.

Thus the dual function edge control-sheet sensing means, as described, incorporates in an extremely simple structure, integral with the spreader structure, means for automatically regulating gap width directly responsive to the width of the sheet structure about to travel therethrough and to control edge leakage of processing liquid from between the sheets.

Since certain changes may be made in the above device without departing from the scope of the invention herein involved, it is intended that all matter contained in the above description or shown in the accompanying drawing shall be interpreted as illustrative and not in a limiting sense.

I claim:

1. Photographic processing apparatus for distributing a processing liquid as a layer between two layers of sheet material comprising, in combination:
   a pair of substantially rigid spreader members having substantially straight parallel adjacent portions juxtaposed to form a narrow pressure-generating gap through which said sheet material is movable;
   spring means for urging said members toward each other tending to close said gap, said members being so constructed as to effect the distribution of said liquid as a layer between layers of said sheet material during movement of said material through said gap; and
   means responsive automatically to the thickness of sheet material approaching said gap for adjusting the force on said spreader members tending to close said gap to facilitate the introduction of selected thicknesses of said sheet material into said gap.

2. A device for distributing a processing liquid in a layer between two layers of sheet material, said device being adapted to use in combination with photographic apparatus from which said sheet material is withdrawn and comprising, in combination:
   a pair of substantially rigid spreader members having substantially straight parallel adjacent portions predeterminedly spaced apart to form a narrow pressure-generating gap through which said sheet material is movable;
   spring means for urging said members toward each other tending to close said gap, said members being so constructed as to effect the distribution of said liquid in a layer between layers of said sheet material during movement of said material through said gap; and
   sheet-sensing means mounted on one of said spreader members in a zone in advance of said gap and spring biased toward the other of said spreader members in opposition to the force imposed on said spreader members by said spring means, said sheet-sensing means tending to force open said spreader members as increased thicknesses of said sheets enter said zone, thereby reducing the force required to advance increased thicknesses of said sheets into the gap.

3. Photographic processing apparatus for distributing a processing liquid as a layer between two layers of sheet material comprising, in combination:
  a pair of substantially rigid spreader members having substantially straight parallel adjacent portions juxtaposed to form a narrow pressure-generating gap through which said sheet material is movable;
  spring means for urging said members toward each other tending to close said gap, said members being so constructed as to effect the distribution of said liquid as a layer between the layers of said sheet material during movement of said material through said gap;
  said spreader members presenting to approaching sections of said sheet material opposed surfaces which converge rapidly toward said narrow gap to minimize the area of surface contact between said spreader members and sheet material within said gap, said rapidly converging surfaces presenting a possible obstacle to the introduction between said members of increased thicknesses of said sheet material;
  means for supporting said sheet material as said sheet material approaches said gap;
  resiliently biased sheet-sensing means mounted in advance of said narrow gap to sense the thickness of said sheet material approaching said gap, said sheet-sensing means presenting gently tapering surface contours to facilitate the introduction of increased thicknesses of said sheet material between said sheet-sensing means and said supporting means; and
  means responsive automatically to the introduction of increased thicknesses of said sheet material between said sheet-sensing means and said supporting means for adjusting the force on said spreader members tending to close said gap in anticipation of the introduction into said gap of said increased thicknesses.

4. Photographic processing apparatus for distributing a processing liquid as a layer between two layers of sheet material comprising, in combination, a pair of substantially rigid spreader members having substantially straight parallel adjacent portions juxtaposed to form a narrow pressure-generating gap through which said sheet material is movable;
  spring means for urging said members toward each other, said members being so constructed as to effect the distribution of said liquid as a layer between the layers of said sheet material during movement of said material through said gap;
  said spreader members presenting to approaching sections of said sheet material opposed surfaces which converge rapidly towards said narrow gap to minimize the area of surface contact between said spreader members and said sheet material within said gap, said rapidly converging surfaces presenting a possible obstacle to the introduction between said members of increased thicknesses of said sheet material;
  means for supporting and guiding said sheet material as said sheet material approaches said gap including an elongated platform integral with one of said spreader members;
  resiliently biased sheet-sensing means including leaf spring means mounted in advance of said narrow gap to sense the thickness of said sheet material approaching said gap, said sheet-sensing means presenting gently tapering surface contours to facilitate the introduction of increased thicknesses of said sheet material between said sheet sensing means and said supporting and guiding means, said leaf spring means extending from the other of said spreader members and biased against said supporting and guiding means; and
  mechanical means comprising surface means on the spreader member from which said leaf spring means extend (and positioned to be engaged by) for engaging a portion of said leaf spring means whereby increased thicknesses of said sheet material introduced between said supporting and guiding means and said sheet-sensing means bias said leaf spring means forcibly against said surface means tending to widen said gap in anticipation of the introduction into said gap of said increased thicknesses.

5. Photographic processing apparatus for distributing a processing liquid as a layer between two layers of sheet material comprising, in combination:
  a pair of substantially rigid spreader members having having substantially straight parallel adjacent portions juxtaposed to form a narrow pressure-generating gap through which said sheet material is movable;
  spring means for urging said members toward each other, said members being so constructed as to effect the distribution of said liquid as a layer between layers of said sheet material during movement of said material through said gap.
  said spreader members presenting to approaching sheet material opposed surfaces which converge rapidly toward said narrow gap to minimize the area of surface contact between said spreader members and sheet material within said gap, said rapidly converging surfaces presenting a possible obstacle to the introduction between said members of increased thicknesses of sheet material;
  resiliently biased sheet-sensing means mounted in advance of said narrow gap to sense the thickness of sheet material approaching said gap, said sheet-sensing means presenting gently tapering opposed surface contours to facilitate the introduction therebetween of increased thicknesses of sheet material, said opposed surface contours defining an elongated platform integral with one of said spreader members and having a surface for supporting and guiding said sheet material toward said gap, and a leaf spring member fastened to the other of said spreader members and having a pair of end portions biased toward said platform surface; and
  mechanical means comprising a pair of extensions on the spreader member to which the leaf spring is fastened and positioned to be forcibly engaged by the end portions of said leaf spring when said end portions are displaced by more than a predetermined distance by increased thicknesses of said sheet material thereby forcing the spreader member apart to widen said gap in anticipation of the introduction into said gap of said increased thicknesses.

6. A device for distributing a processing liquid in a layer between two layers of sheet material said device being adapted to use in combination with photographic apparatus from which said sheet material is withdrawn comprising, in combination:
  a pair of substantially rigid spreader members having substantially straight parallel adjacent portions predeterminedly spaced apart to form a narrow pressure generating gap through which said sheet material is movable, facing surfaces on said rigid members converging angularly toward each other to define a narrowing throat to guide said sheet material toward said gap;
  first spring means for urging said members toward each other, said members being so constructed as to effect the distribution of said liquid in a layer between layers of said sheet material during movement of said material through said gap; and edge control means including edge-contacting surfaces facing each other in advance of said pressure-generating gap and second spring means for biasing said edge-contacting surfaces toward each other thereby to squeeze the lateral edges of said sheets of material together to prevent said liquid distributed between said sheets from leaking from the side edges thereof as the sheet material is moved through said gap, the force of said second spring means tending to oppose the force exerted on said spreader members by said first spring means.

7. A device for distributing a processing liquid in a layer between two layers of sheet material said device be adapted to use in combination with photographic apparatus from which said sheet material is withdrawn comprising, in combination:
   a pair of substantially rigid non-rolling spreader members having substantially straight parallel adjacent portions predeterminedly spaced apart to form a narrow pressure-generating gap through which said sheet material is movable;
   a pair of facing surfaces on said surface members converging angularly toward each other to define a narrowing throat to guide said sheet material toward said gap;
   spring means for urging said members toward each other, said members being so constructed as to effect the distribution of said liquid in a layer between layers of said sheet material during movement of said material through said gap; and
   edge-control means for squeezing the lateral edges of said sheets of material together to prevent said liquid distributed between said sheets from leaking from the side edges thereof as the sheet material is moved from said gap, said edge-control means comprising elongated leaf spring means mounted on one of said pair of spreader members in a position in advance of said gap, the ends of said spring means contacting the lateral edges of said sheet material as it is drawn toward said gap and forcing said lateral edges toward surfaces fixed with respect to the other of said pair of spreader members.

8. A device for distributing a processing liquid in a layer between two layers of sheet material said device being adapted to use in combination with photographic apparatus from which said sheet material is withdrawn comprising, in combination:
   a pair of substantially rigid nonrolling spreader members having substantially straight parallel adjacent portions predeterminedly spaced apart to form a narrow pressure-generating gap through which said sheet material is movable;
   a pair of facing surfaces on said surface members converging angularly toward each other to define a narrowing throat to guide said sheet material toward said gap;
   spring means for urging said members toward each other, said members being so constructed as to effect the distribution of said liquid in a layer between layers of said sheet material during movement of said material through said gap; and
   edge-control means for squeezing the lateral edges of said sheets of material together to prevent said liquid distributed between said sheets from leaking from the side edges thereof as the sheet material is moved from said gap, said edge-control means comprising an elongated leaf spring member mounted at a midportion thereof on one of said pair of spreader members in a position in advance of said gap, the ends of said spring member contacting the lateral edges of said sheet material as it is drawn toward said gap and forcing said lateral edges against opposing surfaces on the other of said spreader members.

9. Photographic processing apparatus for distributing a processing liquid as a layer between two layers of material comprising, in combination:
   a pair of substantially rigid nonrolling spreader members having substantially straight parallel portions juxtaposed to form a narrow pressure-generating gap through which said sheet material is movable;
   a pair of facing surfaces on said rigid members converging angularly toward each other to define a narrowing throat to guide said sheet material toward said gap;
   spring means for urging said members toward each other, said members being so constructed as to effect the distribution of said liquid as a layer between layers of said sheet material during movement of said material through said gap; and
   dual function edge control-sheet sensing means operable to prevent said liquid distributed between said sheets from leaking from the side edges thereof as the sheet material is moved through said gap and operable to sense the thickness of said sheet material approaching said gap and to widen said gap to facilitate the movement therethrough of said material greater than a predetermined thickness.

10. Photographic processing apparatus for distributing a processing liquid as a layer between two layers of material comprising, in combination:
    a pair of substantially rigid nonrolling spreader members having substantially straight parallel portions juxtaposed to form a narrow pressure-generating gap through which said sheet material is movable;
    a pair of facing surfaces on said rigid members converging angularly toward each other to define a narrowing throat to guide said sheet material toward said gap;
    spring means for urging said members toward each other, said members being so constructed as to effect the distribution of said liquid as a layer between layers of said sheet material during movement of said material through said gap; and
    dual function edge control-sheet sensing means operable to prevent said liquid distributing between said sheets from leaking from the side edges thereof as the sheet material is moved through said gap and operable to sense the thickness of said sheet material approaching said gap and to widen said gap to facilitate the movement therethrough of said material greater than a predetermined thickness, said dual function edge control-sheet sensing means comprising an elongated leaf spring member mounted on one of said pair of spreader members in a position in advance of said gap, the ends of said spring member contacting the lateral edges of said material as it is drawn towards said gap.

11. Photographic processing apparatus for distributing a processing liquid as a layer between two layers of sheet material comprising, in combination:
    a pair of substantially rigid spreader members having substantially straight parallel adjacent portions juxtaposed to form a narrow pressure-generating gap through which said sheet material is movable;
    spring means for urging said members toward each other, said members being so constructed as to effect the distribution of said liquid as a layer between layers of said sheet material during movement of said material through said gap;
    dual function edge control-sheet sensing means for squeezing the lateral edges of said sheets of material together to prevent said liquid distributed between said sheets from leaking from the side edges thereof during movement of said material through said gap, said means comprising opposed spring-biased surfaces for contacting lateral edges of said material approaching said gap, said spring-biased surfaces being forced apart by a distance equal to the thickness of said sheet material therebetween, the opposed spring-biased surfaces for contacting said lateral edges of sheet material comprising an elongated platform for supporting and guiding said material toward said narrow gap integral with one of said spreader members and leaf spring means fastened to the other of said spreader members and having a pair of end portions biased toward said platform surface; and mechanical means comprising an engageable surface means on the spreader member to which the leaf spring means is fastened and positioned to be forcibly engaged by the end portions of said leaf spring means when said end portions are displaced by more than a predetermined distance by increased thicknesses of said sheet material thereby forcing the spreader members apart to widen said gap in anticipation of the introduction into said gap of said increased thicknesses.

12. Photographic processing apparatus for distributing a processing liquid as a layer between two layers of sheet material comprising, in combination:

a pair of substantially rigid spreader members having substantially straight parallel adjacent portions juxtaposed to form a narrow pressure-generating gap through which said sheet material is movable;

spring means for urging said members toward each other, said members being so constructed as to effect the distribution of said liquid as a layer between layers of said sheet material during movement of said material through said gap;

dual function edge control-sheet sensing means for squeezing the lateral edges of said sheets of material together to prevent said liquid distributed between said sheets from leaking from the side edges thereof during movement of said material through said gap, said means comprising opposed spring-biased surfaces for contacting lateral edges of said material approaching said gap, said spring-biased surfaces being forced apart by a distance equal to the thickness of said sheet material therebetween, the opposed spring-biased surfaces for contacting said lateral edges of sheet material comprising an elongated platform for supporting and guiding said sheet material toward said narrow gap integral with one of said spreader members and a resiliently deflectible means fastened to the other of said spreader members and having a pair of end portions biased toward said platform surface; and mechanical means response to the separation of said spring-biased edge control surfaces by more than a predetermined amount for increasing the width of said pressure-generating gap in anticipation of the introduction between said spreader members of increased thicknesses of sheet material.

13. Photographic processing apparatus for distributing a processing liquid as a layer between two layers of sheet material comprising, in combination:

a pair of substantially rigid spreader members having substantially straight parallel adjacent portions juxtaposed to form a narrow pressure-generating gap through which said sheet material is movable;

spring means for urging said members toward each other, said members being so constructed as to effect the distribution of said liquid as a layer between layers of said sheet material during movement of said material through said gap;

dual function edge control-sheet sensing means for squeezing the lateral edges of said sheets of material together to prevent said liquid distributed between said sheets from leaking from the side edges thereof during movement of said material through said gap, said means comprising opposed spring-biased surfaces for contacting lateral edges of said material approaching said gap, said spring-biased surfaces being forced apart by a distance equal to the thickness of said sheet material therebetween, the opposed spring-biased surfaces for contacting said lateral edges of sheet material comprising an elongated platform for supporting and guiding said material toward said narrow gap integral with one of said spreader members and a leaf spring member fastened to the other of said spreader members and having a pair of end portions biased toward said platform surface; and mechanical means comprising a pair of extensions on the spreader member to which the leaf spring is fastened and positioned to be forcibly engaged by the end portions of said leaf spring when said end portions are displaced by more than a predetermined distance by increased thicknesses of said sheet material thereby forcing the spreader members apart.

14. In a photographic camera, a device for distributing a processing liquid in the layer between two layers of material of which at least one is photosensitive and adapted for exposure to image-forming light within the camera comprising, in combination:

a pair of substantially rigid spreader members having substantially straight parallel adjacent portions juxtaposed to form a narrow pressure-generating gap through which said sheet material is movable;

a pair of facing surfaces on said rigid members converging angularly toward each other to define a narrowing throat to guide said sheet material toward said gap, at least one of the facing surfaces forming a platform for supporting and guiding the sheet material toward the narrow gap;

spring means for urging said spreader members toward each other, said members being so constructed as to effect the distribution of said liquid as a layer between layers of said sheet material during movement of said material through said gap;

dual function edge control-sheet sensing means operable to prevent said liquid distributing between said sheets from leaking from the side edges thereof as the sheet material is moved through said gap and operable to sense the thickness of said sheet material approaching said gap and to widen said gap to facilitate the movement therethrough of said material greater than a predetermined thickness, said dual function edge control-sheet sensing means comprising leaf spring means mounted on one of said pair of spreader members in a position in advance of said gap, said leaf spring means having a pair of end portions contacting the lateral edges of said sheet material as it is drawn towards said gap and urging said edges against said platform; and mechanical means comprising engageable surface means on the spreader members upon which the leaf spring means are mounted and positioned to be forcibly engaged by the end portions of said leaf spring means when said end portions are displaced by more than a predetermined distance by increased thicknesses of said sheet material thereby forcing the spreader members apart to widen said gap in anticipation of the introduction into said gap of said increased thicknesses.

15. The invention of claim 14 wherein said platform for supporting and guiding the sheet material toward the narrow gap is relieved in a zone immediately before the gap.

16. The invention of claim 15 including separating means for widening said pressure-generating gap for cleaning purposes, said separating means including a camming means in contact with said spring means, said camming means being operable to urge said spring means in a direction forcing said rigid members apart and widening said gap.

17. The invention of claim 16 including restraining means mounted adjacent at least one of said pair of rigid members preventing separation of said rigid members and widening of said gap by more than a predetermined distance.

18. Photographic processing apparatus for distributing a processing liquid as a layer between two layers of sheet material, comprising:
- a pair of substantially rigid members having adjacent portions juxtaposed to form a narrow gap through which such sheet material is movable;
- means for resiliently urging said rigid members toward each other at least when force is exerted on said rigid members by such sheet material passing through said gap tending to increase the size of said gap to thereby effect the spreading of such liquid in a layer between the two layers of such sheet material; and
- means for adjusting the force urging said rigid members toward each other as a function of the thickness of progressive sections of such sheet material approaching said gap, said force adjusting means including at least one support surface extending from one of said rigid members and at least one sheet-sensing member connected to the other of said rigid members and extending therefrom into initial contact with said support surface and so as to engage such progressive sections of such sheet material approaching said gap against said support surface.

19. Photographic processing apparatus for distributing a processing liquid as a layer between two layers of sheet material, comprising:
- a pair of substantially rigid members having adjacent portions juxtaposed to form a narrow gap through which such sheet material is movable;
- means for resiliently urging said rigid members toward each other at least when force is exerted on said rigid members by such sheet material passing through said gap tending to increase the size of said gap to thereby effect the spreading of such liquid in a layer between the two layers of such sheet material; and
- means for automatically adjusting the force urging said rigid members toward each other as a function of the thickness of progressive sections of such sheet material approaching said gap, said adjusting means including spring means extending from one of said rigid members adapted to contact such sheet material in advance of said gap and biased to exert a force on said one spreader member tending to increase the size of said gap when in contact with such sheet material.

20. Photographic processing apparatus for distributing a processing liquid as a layer between two layers of sheet material, comprising:
- a pair of substantially rigid members having adjacent portions juxtaposed to form a narrow gap through which such sheet material is movable;
- means for resiliently urging said rigid members toward each other at least when force is exerted on said rigid members by such sheet material passing through said gap tending to increase the size of said gap thereby effecting the spreading of such liquid in a layer between the two layers of such sheet material; and
- means contacting the edges of such sheet material in advance of said gap for preventing such liquid distributed between the two layers of such sheet material from leaking from such edges including at least one support surface associated with one of said rigid members and at least one force applying member extending from the other one of said rigid members to initially bear against said support surface and to permit such sheet material approaching said gap to pass between said support surface and said force applying member.

21. Photographic apparatus for distributing a processing liquid in a layer between two layers of sheet material comprising, in combination:
- a pair of substantially rigid spreader members having adjacent portions predeterminedly spaced apart to form a narrow pressure-generating gap through which such sheet material is movable;
- spring means for urging said members toward each other, said members being so constructed as to effect the distribution of such liquid in a layer between the layers of such sheet material during movement of such material through said gap; and
- sheet-sensing means mounted on one of said spreader members in a zone in advance of said gap and spring biased toward the other of said spreader members in opposition to the force imposed on said spreader members by said spring means, thereby reducing the force required to advance increased thicknesses of such sheet material into said gap, said sheet-sensing means tending to increase the size of said gap as increased thicknesses of such sheet material enter such zone.

References Cited

UNITED STATES PATENTS

| | | | |
|---|---|---|---|
| 2,845,850 | 8/1958 | Bing et al. | 95—13 |
| 2,854,904 | 10/1958 | Bishop | 95—13 |

NORTON ANSHER, Primary Examiner

R. L. MOSES, Assistant Examiner

U.S. Cl. X.R.

95—89

UNITED STATES PATENT OFFICE
CERTIFICATE OF CORRECTION

Patent No. 3,499,373            March 10, 1970

Ezio D. Cotta

It is certified that error appears in the above identified patent and that said Letters Patent are hereby corrected as shown below:

Column 1, line 52, after "in", second occurrence, insert -- cost of manufacture, its compactness and lightweight --. Column 5, line 36, "positions" should read -- position --. Column 8, line 6, after "extend" cancel "(and positioned to be engaged by)"; line 18, cancel "having"; line 26, the period (.) should read a semicolon (;). Column 9, line 14, "be" should read -- being --, Column 11, line 48, "response" should read -- responsive --.

Signed and sealed this 19th day of January 1971.

(SEAL)

Attest:

Edward M. Fletcher, Jr.

Attesting Officer

WILLIAM E. SCHUYLER, JR.
Commissioner of Patents